United States Patent
Cheng (10) Patent No.: US 8,472,756 B2
(45) Date of Patent: Jun. 25, 2013

(54) METHOD FOR PRODUCING HIGH RESOLUTION IMAGE

(75) Inventor: Ting-Yuan Cheng, Taipei (TW)

(73) Assignee: Primax Electronics Ltd, Taipei (TW)

( * ) Notice: Subject to any disclaimer, the term of this patent is extended or adjusted under 35 U.S.C. 154(b) by 430 days.

(21) Appl. No.: 12/908,708

(22) Filed: Oct. 20, 2010

(65) Prior Publication Data

US 2012/0038785 A1     Feb. 16, 2012

(30) Foreign Application Priority Data

Aug. 13, 2010   (TW) ................................ 99127054 A (51) Int. Cl.
*G06K 9/00*    (2006.01)

(52) U.S. Cl.
USPC ........... 382/300; 382/103; 382/106; 382/154; 382/299

(58) Field of Classification Search
USPC ................. 382/103, 106, 107, 154, 285, 299, 382/300
See application file for complete search history.

(56) References Cited

U.S. PATENT DOCUMENTS

| | | | |
|---|---|---|---|
| 7,412,114 B2 * | 8/2008 | Itoh et al. ...................... | 382/300 |
| 8,027,545 B2 * | 9/2011 | Lee et al. ...................... | 382/233 |
| 8,090,031 B2 * | 1/2012 | Wong et al. ............... | 375/240.29 |
| 8,374,456 B2 * | 2/2013 | Vetro et al. ..................... | 382/260 |
| 2002/0015517 A1 * | 2/2002 | Hwang et al. ................. | 382/131 |
| 2002/0064309 A1 * | 5/2002 | Shinagawa et al. ........... | 382/206 |

* cited by examiner

*Primary Examiner* — Wesley Tucker
(74) *Attorney, Agent, or Firm* — Tracy M. Heims; Apex Juris, pllc (57) ABSTRACT

A high resolution image producing method includes the following steps. Firstly, an object is continuously shot to produce plural shot images. Then, plural original images are selected from the plural shot images. Then, each of the original images is segmented into plural blocks, and the motion vector of each block of each original image is calculated. Then, a first original image is scaled-up to acquire a first basis image, and a second basis image is acquired by copying the first basis image. A phase error is calculated according to the first basis image, and an interpolating operation is performed on the second basis image to obtain a high resolution image.

13 Claims, 9 Drawing Sheets

METHOD FOR PRODUCING HIGH RESOLUTION IMAGE

FIELD OF THE INVENTION

The present invention relates to a high resolution image producing method, and more particularly to a method for producing a high resolution image by using a plurality of low resolution images.

BACKGROUND OF THE INVENTION

Generally, there are two methods for producing high resolution images. The first method uses a high resolution camera to acquire a high resolution image. The second method uses a low resolution camera to acquire a high resolution image. For example, for using a low resolution web camera to shoot a business card and performing character recognition on the shot image of the business card, an application program is executed to perform an image processing operation on a plurality of low resolution images so as to produce the high resolution image.

Figure 1:
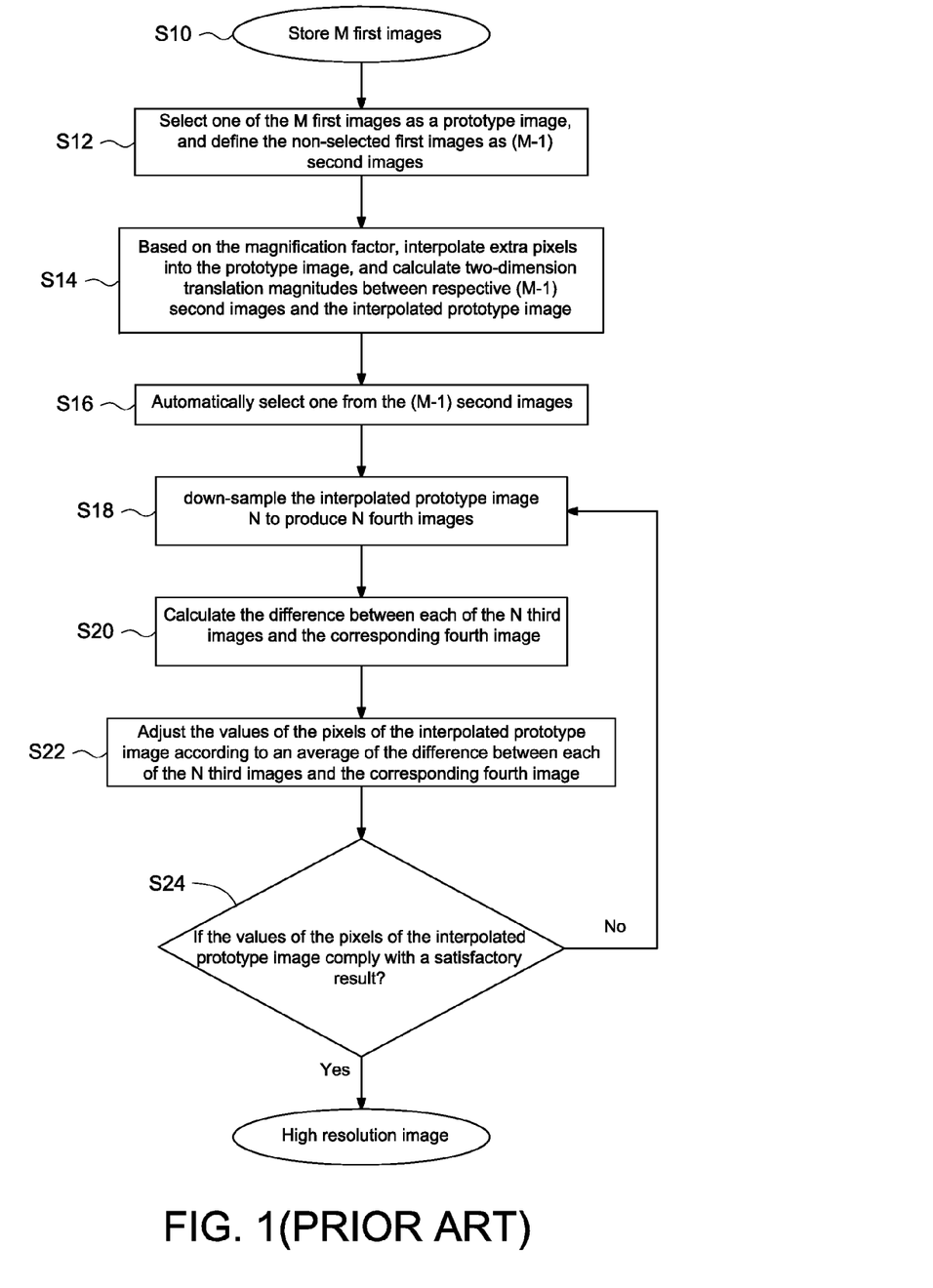
FIG. 1 is a flowchart illustrating a high resolution image producing method according to the prior art.

A method for producing a high resolution image by using a plurality of low resolution images is disclosed in for example Taiwanese Patent No. TW583603. Hereinafter, the high resolution image producing method according to Taiwanese Patent No. TW583603 will be illustrated with reference to FIG. 1. FIG. 1 is a flowchart illustrating a high resolution image producing method according to the prior art. Firstly, in the step S10, M first images are stored. Then, the step S12 is performed to select one of the M first images as a prototype image, and define the non-selected first images as (M−1) second images. In the step S14, based on the magnification factor, extra pixels are interpolated into the prototype image, and then the two-dimension translation magnitudes existing between respective (M−1) second images and the interpolated prototype image are calculated. Then, in the step S16, the two-dimension translation magnitudes of the (M−1) second images are respectively divided by the magnification factor to obtain the modulus values. Then, one second image is selected from the second images whose related modulus values are the same, and the selected second image together with the rest of the second images whose related modulus values are not the same are defined as N third images. Then, the step S18 is performed to down-sample the interpolated prototype image N according to the respective translation magnitudes between the N third images and the interpolated prototype image, thereby producing N fourth images. In the step S20, the difference between each of the N third images and the corresponding fourth image is calculated. Then, the step S22 is performed to adjust the values of the pixels of the interpolated prototype image according to an average of the difference between each of the N third images and the corresponding fourth image. Then, the step S24 is performed to determine if the values of the pixels of the interpolated prototype image comply with a satisfactory result. If these values do not comply with the satisfactory result, the steps S18 through S22 are repeatedly done until a high resolution image is obtained.

The conventional high resolution image producing method, however, still has some drawbacks. This method comprises three stages to reconstruct the high resolution image: i.e. an initial guessing stage (S10~S14), an automatic image-selecting stage (S16) and a repeated correcting stage (S18~S24). Since the repeated correcting stage needs complex and time-consuming computation, the high resolution image or the recognizing result fails to be realized by the user in a short time. In other words, the conventional high resolution image producing method is not user-friendly.

SUMMARY OF THE INVENTION

The present invention relates to a method for producing a high resolution image at a high computing speed.

In accordance with an aspect of the present invention, there is provided a high resolution image producing method. The high resolution image producing method includes steps of: (A) successively shooting an object for plural times to acquire plural shot images of the object; (B) selecting two original images from the plural shot images; (C) segmenting the two original images into plural blocks, respectively, wherein each block comprises plural pixels; (D) calculating a displacement of a graphic part of each block of a first original image with respect to a second original image, thereby acquiring a block motion vector of each block of the first original image; (E) scaling-up the first original image with a first amplification factor, thereby acquiring a first basis image; (F) copying the first basis image to acquire a second basis image; (G) calculating a position of a motion pixel of said second original image corresponding to an operated pixel of said first basis image, calculating an average of a brightness value of the operated pixel of the first basis image and a brightness value of the motion pixel to acquire an interpolation pixel value, and performing an interpolating operation to fill the interpolation pixel value into the same coordinate position of the second basis image as the operated pixel of the first basis image; and (H) repeatedly performing the step (G) until the interpolating operation is performed on all pixels of the second basis image, thereby producing a high resolution image H.

In an embodiment, after the step (H), the method further includes a step (I) of compressing the high resolution image H into an output image.

In an embodiment, the step (B) of selecting the two original images includes sub-steps of: detecting four edges of each of the shot images to acquire four corners of each of the shot images; calculating an area of each of the shot images according to the four corners of each of the shot images; and acquiring the two original images according to a difference between the area of each of the shot images and an area of the object.

In an embodiment, after the step (H), the method further includes steps of: (I) defining the high resolution image H as a first high resolution basis image H'; (J) copying the first high resolution basis image H' to acquire a second high resolution basis image H"; (K) calculating a position of a motion pixel of the second original image corresponding to an operated pixel of the first high resolution basis image H', calculating an average of a brightness value of the operated pixel of the first high resolution basis image H' and a brightness value of the motion pixel to acquire an interpolation pixel value, and performing an interpolating operation to fill the interpolation pixel value into the same coordinate position of the second high resolution basis image H" as the operated pixel of the first high resolution basis image H'; (L) repeatedly performing the step (K) until the interpolating operation is performed on all pixels of the second high resolution basis image H", thereby producing another high resolution image; and (M) compressing the another high resolution image into another output image.

In an embodiment, the step (D) of acquiring the block motion vector of each block of the first original image includes sub-steps of: selecting a pixel of a block of the first original image to be a first datum point, and selecting another pixel of the second original image at the same coordinate position as the first datum point to be a second datum point;

calculating brightness values of the second datum point and plural neighboring pixels around the second datum point; comparing a brightness value of the first datum point with respective brightness values of the second datum point and the plural neighboring pixels around the second datum point; selecting a pixel whose brightness value is the closest to the brightness value of the first datum point to be a third datum point; and subtracting the coordinate value of the first datum point from a coordinate value of the third datum point, thereby obtaining the block motion vector.

In an embodiment, the step (G) of calculating the position of the motion pixel includes sub-steps of: (G-1) acquiring the operated pixel (nX, nY) of a block of the first basis image and plural neighboring pixels (nX±n, nY±n) around the operated pixel, calculating brightness values of the operated pixel and the plural neighboring pixels around the operated pixel, and dividing a coordinate value of the operated pixel by the first amplification factor of the first original image to acquire a pixel (X,Y) of the first original image corresponding to the operated pixel, wherein n is the first amplification factor; (G-2) calculating a position of moving the pixel (X,Y) to a pixel (X', Y') of the second original image according to the block motion vector of the block where the pixel (X,Y) is located; (G-3) defining a (2n−1)×(2n−1) matrix whose center corresponds to the pixel (X', Y') as a searching range, and calculating brightness values of plural pixels of a 3×3 matrix whose center corresponds to the pixel (X',Y'), wherein n is the first amplification factor; (G-4) calculating an average brightness difference between the plural pixels of the 3×3 matrix whose center corresponds to the pixel (X', Y') and the operated pixel (nX, nY) and the plural neighboring pixels (nX±n, nY±n) around the operated pixel; (G-5) selecting a pixel (X", Y") from the plurality pixels of the (2n−1)×(2n−1) matrix whose center corresponds to the pixel (X',Y'), and calculating an average brightness difference between the plural pixels of the 3×3 matrix whose center corresponds to the pixel (X",Y") and the operated pixel (nX, nY) and the plural neighboring pixels (nX±n, nY±n) around the operated pixel; (G-6) repeatedly performing the step (G-5) until all average brightness differences are acquired, wherein n is the first amplification factor; (G-7) selecting a pixel matrix having the lowest average brightness difference, and defining a center pixel of the pixel matrix as the motion pixel of the second original image corresponding to the operated pixel; and (G-8) repeatedly performing the steps (G-1) through (G-7) until all motion pixels of the second original image corresponding to all pixels of all blocks of the first basis image are acquired.

In accordance with another aspect of the present invention, there is provided a high resolution image producing method. The high resolution image producing method includes steps of: (A) successively shooting an object for plural times to acquire plural shot images of the object; (B) selecting three original images from the plural shot images; (C) segmenting the three original images into plural blocks, respectively, wherein each block comprises plural pixels; (D) calculating a displacement of a graphic part of each block of a first original image with respect to a second original image, thereby acquiring a block motion vector of each block of the first original image; (E) calculating a displacement of a graphic part of each block of the second original image with respect to a third original image, thereby acquiring a block motion vector of each block of the second original image; (F) scaling-up the first original image with a first amplification factor, thereby acquiring a first basis image; (G) copying the first basis image to acquire a second basis image; (H) calculating a position of a first motion pixel of the second original image corresponding to an operated pixel of the first basis image, calculating an average of a brightness value of the operated pixel of the first basis image and a brightness value of the first motion pixel to acquire a first interpolation pixel value, and performing an interpolating operation to fill the first interpolation pixel value into the same coordinate position of the second basis image as the operated pixel; calculating a position of a second motion pixel of the third original image corresponding to the operated pixel of the first basis image, calculating an average of the first interpolation pixel value and a brightness value of the second motion pixel to acquire a second interpolation pixel value, and performing an interpolating operation to fill the second interpolation pixel value into the same coordinate position of the second basis image as the operated pixel; and (I) repeatedly performing the step (H) until the interpolating operation is performed on all pixels of the second basis image, thereby producing a high resolution image H.

In an embodiment, after the step (I), the method further includes a step (J) of compressing the high resolution image H into an output image.

In an embodiment, the step (B) of selecting the three original images includes sub-steps of: detecting four edges of each of the shot images to acquire four corners of each of the shot images; calculating an area of each of the shot images according to the four corners of each of the shot images; and acquiring the three original images according to a difference between the area of each of the shot images and an area of the object.

In an embodiment, after the step (I), the method further includes steps of: (J) defining the high resolution image H as a first high resolution basis image H'; (K) copying the first high resolution basis image H' to acquire a second high resolution basis image H"; (L) calculating a position of a first motion pixel of the second original image corresponding to an operated pixel of the first high resolution basis image H', calculating an average of a brightness value of the operated pixel of the first high resolution basis image H' and a brightness value of the first motion pixel to acquire a first interpolation pixel value, and performing an interpolating operation to fill the first interpolation pixel value into the same coordinate position of the second high resolution basis image H" as the operated pixel of the first high resolution basis image H'; calculating a position of a second motion pixel of the third original image corresponding to the operated pixel of the first high resolution basis image H', calculating an average of the first interpolation pixel value and a brightness value of the second motion pixel to acquire a second interpolation pixel value, and performing an interpolating operation to fill the second interpolation pixel value into the same coordinate position of the second high resolution basis image H" as the operated pixel of the first high resolution basis image H'; (M) repeatedly performing the step (L) until the interpolating operation is performed on all pixels of the second high resolution basis image H", thereby producing another high resolution image; and (N) compressing the another high resolution image into another output image.

In an embodiment, the step (D) of acquiring the block motion vector of each block of the first original image includes sub-steps of: selecting a pixel of a block of the first original image to be a first datum point, and selecting another pixel of the second original image at the same coordinate position as the first datum point to be a second datum point; calculating brightness values of the second datum point and plural neighboring pixels around the second datum point; comparing a brightness value of the first datum point with respective brightness values of the second datum point and the plural neighboring pixels around the second datum point;

selecting a pixel whose brightness value is the closest to the brightness value of the first datum point to be a third datum point; and subtracting the coordinate value of the first datum point from a coordinate value of the third datum point, thereby obtaining the block motion vector.

In an embodiment, the step (E) of acquiring the block motion vector of each block of the second original image includes sub-steps of: selecting a pixel of a block of the second original image to be a first datum point, and selecting another pixel of the third original image at the same coordinate position as the first datum point to be a second datum point; calculating brightness values of the second datum point and plural neighboring pixels around the second datum point; comparing a brightness value of the first datum point with respective brightness values of the second datum point and the plural neighboring pixels around the second datum point; selecting a pixel whose brightness value is the closest to the brightness value of the first datum point to be a third datum point; and subtracting the coordinate value of the first datum point from a coordinate value of the third datum point, thereby obtaining the block motion vector.

In an embodiment, the step (H) of calculating the position of the motion pixel includes sub-steps of: (H-1) acquiring the operated pixel (nX, nY) of a block of the first basis image and plural neighboring pixels (nX±n, nY±n) around the operated pixel, calculating brightness values of the operated pixel and the plural neighboring pixels around the operated pixel, and dividing a coordinate value of the operated pixel by the first amplification factor of the first original image to acquire a pixel (X,Y) of the first original image corresponding to the operated pixel, wherein n is the first amplification factor; (H-2) calculating a position of moving the pixel (X,Y) to a pixel (X', Y') of the second original image according to the block motion vector of the block where the pixel (X,Y) is located; (H-3) defining a (2n−1)×(2n−1) matrix whose center corresponds to the pixel (X', Y') as a searching range, and calculating brightness values of plural pixels of a 3×3 matrix whose center corresponds to the pixel (X', Y'), wherein n is the first amplification factor; (H-4) calculating an average brightness difference between the plural pixels of the 3×3 matrix whose center corresponds to the pixel (X', Y') and the operated pixel (nX, nY) and the plural neighboring pixels (nX±n, nY±n) around the operated pixel; (H-5) selecting a pixel (X", Y") from the plurality pixels of the (2n−1)×(2n−1) matrix whose center corresponds to the pixel (X', Y'), and calculating an average brightness difference between the plural pixels of the 3×3 matrix whose center corresponds to the pixel (X", Y") and the operated pixel (nX, nY) and the plural neighboring pixels (nX±n, nY±n) around the operated pixel; (H-6) repeatedly performing the step (H-5) until all average brightness differences are acquired, wherein n is the first amplification factor; (H-7) selecting a pixel matrix having the lowest average brightness difference, and defining a center pixel of the pixel matrix as the first motion pixel of the second original image corresponding to the operated pixel; (H-8) calculating a position of moving the first motion pixel to a pixel (X", Y") of the third original image according to the block motion vector of the block where the first motion pixel of the second original image is located; (H-9) defining a (2n−1)×(2n−1) matrix whose center corresponds to the pixel (X", Y") as a searching range, and calculating brightness values of plural pixels of a 3×3 matrix whose center corresponds to the pixel (X", Y"), wherein n is the first amplification factor; (H-10) calculating an average brightness difference between the plural pixels of the 3×3 matrix whose center corresponds to the pixel (X", Y") and the operated pixel (nX, nY) and the plural neighboring pixels (nX±n, nY±n) around the operated pixel; (H-11) selecting a pixel (X''', Y''') from the plurality pixels of the (2n−1)×(2n−1) matrix whose center corresponds to the pixel (X", Y"), and calculating an average brightness difference between the plural pixels of the 3×3 matrix whose center corresponds to the pixel (X''', Y''') and the operated pixel (nX, nY) and the plural neighboring pixels (nX±n, nY±n) around the operated pixel; (H-12) repeatedly performing the step (H-11) until all average brightness differences are acquired, wherein n is the first amplification factor; (H-13) selecting a pixel matrix having the lowest average brightness difference, and defining a center pixel of the pixel matrix as the second motion pixel of the third original image corresponding to the operated pixel; and (H-14) repeatedly performing the steps (H-1) through (H-13) until all motion pixels of the second original image and the third original image corresponding to all pixels of all blocks of the first basis image are acquired.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For obviating the drawbacks encountered from the prior art, the present invention provides a method for producing a high resolution image at a high computing speed. The method will be illustrated in more details as follows.

Figure 2:
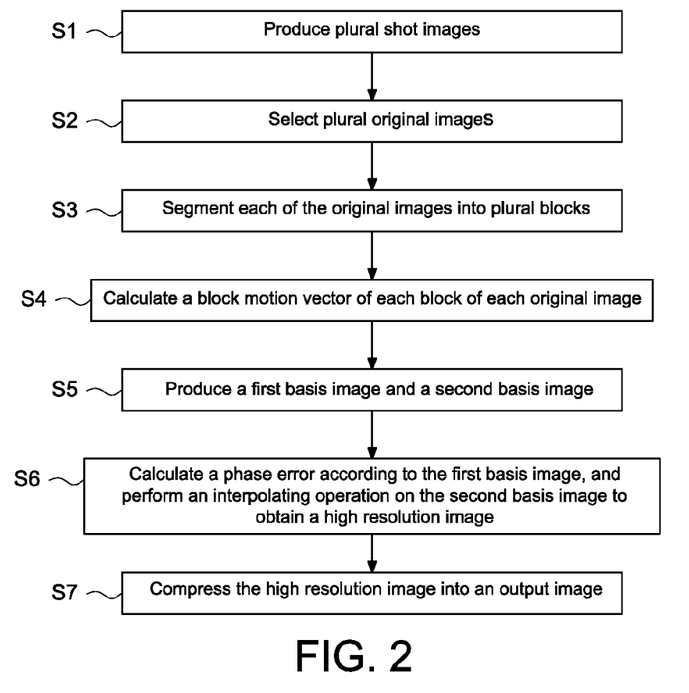
FIG. 2 is a flowchart illustrating a high resolution image producing method according to a first embodiment of the present invention.

FIG. 2 is a flowchart illustrating a high resolution image producing method according to a first embodiment of the present invention. In the step S1, plural shot images are produced. Then, in the step S2, plural original images are selected from the shot images. In the step S3, each of the original images is segmented into plural blocks. Then, in the step S4, a block motion vector of each block of each original image is calculated. In the step S5, a first basis image and a second basis image are produced. Then, in the step S6, a phase error is calculated according to the first basis image, and an interpolating operation is performed on the second basis image to obtain a high resolution image. Afterwards, in the step S7, the high resolution image is compressed into an output image.

Hereinafter, the steps of the high resolution image producing method will be illustrated in more details.

The step S1 is performed to acquire plural shot images. The present invention may produce a high resolution image by using a plurality of low resolution images. For example, the high resolution image producing method of the present invention may be used for recognizing the image of a business card.

Figure 3:
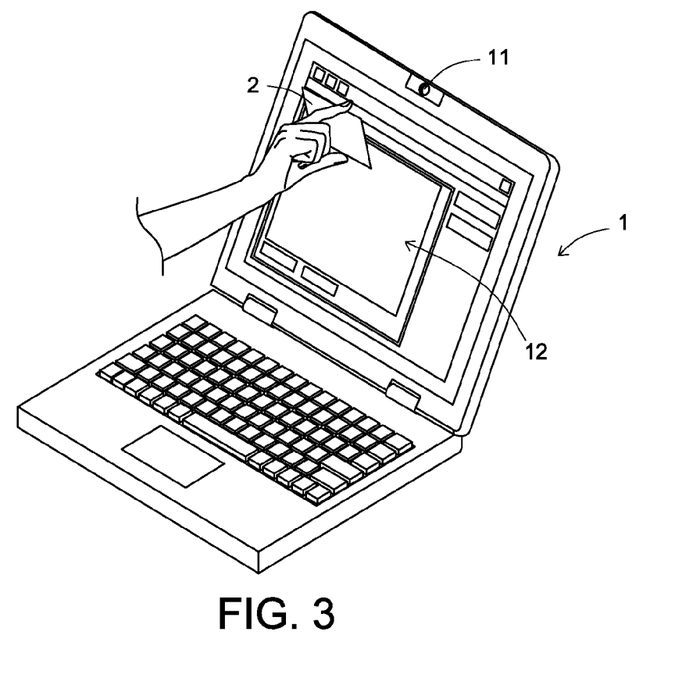
FIG. 3 is a schematic view illustrating a business card recognition system using the high resolution image producing method according to the first embodiment of the present invention.
Figure 4:
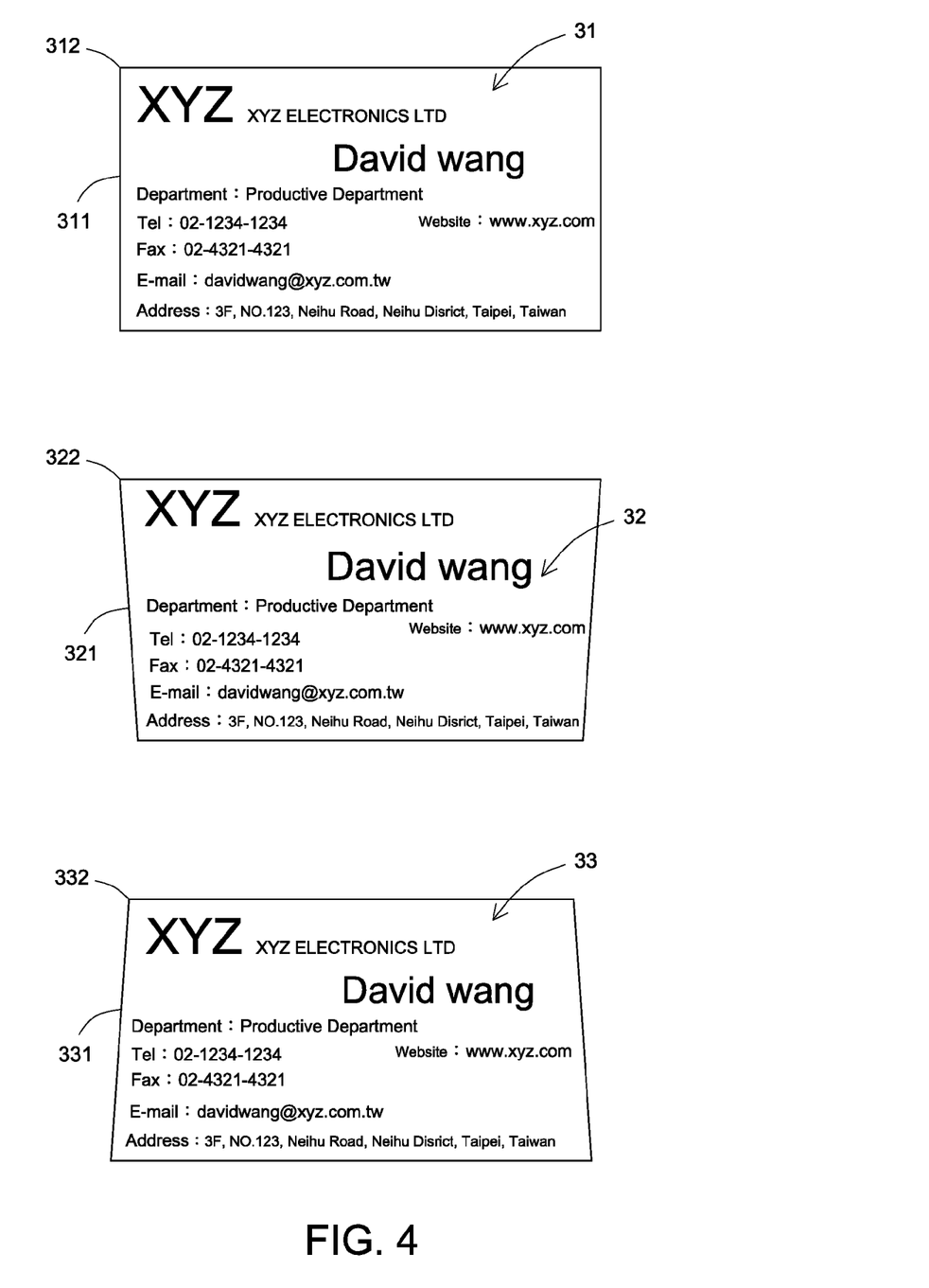
FIG. 4 schematically illustrates three shot images acquired by the high resolution image producing method according to the first embodiment of the present invention.

FIG. 3 is a schematic view illustrating a business card recognition system using the high resolution image producing method according to the first embodiment of the present invention. As shown in FIG. 3, the business card recognition system comprises a computer 1 and a web camera 11. The web camera 11 is installed in the computer 1. The business card 2 to be recognized is placed in front of the web camera 11. Then, the distance between the business card 2 and the web camera 11 is adjusted such that the image of the business card 2 is maintained to be disposed within a shooting window 12. Afterwards, the web camera 11 successively shoots the business card 2 for plural times, thereby acquiring plural shot images. For example, the shot images are shown in FIG. 4.

In the step S2, plural original images are selected from the plural shot images. The original images may be post-processed to produce the high resolution image, which will be illustrated later. In a case that the business card 2 is held by the user's hand during the process of shooting the business card 2, the sizes and the tilt angles of the shot images may be different because the user's hand is readily rocked. As a consequence, the step of selecting the original images from the plural shot images is necessary. For clarification and brevity, only three shot images 31, 32 and 33 are shown in FIG. 4. As shown in FIG. 4, the sizes and the areas of the three shot images 31, 32 and 33 are distinguished. The purpose of this step is to select the shot images whose sizes are very close to the business card 2.

In some embodiments, for judging whether the size of the shot image is nearly equal to the actual size of the business card 2, the four edges 311, 321 and 331 of respective shot images 31, 32 and 33 are detected and then the coordinate values of the four corners 312, 322 and 332 of respective shot images 31, 32 and 33 are obtained. According to the coordinate values of the corners 312, 322 and 332, the side lengths and the areas of respective shot images 31, 32 and 33 are calculated. For example, in a case that the area of the business card 2 is 50 square centimeters and the areas of the three shot images 31, 32 and 33 are respectively 49, 45 and 46 square centimeters, the shot image 31 is retained as the original image to be post-processed because the area of the shot image 31 is the closest to the actual area of the business card 2. Whereas, the shot images 32 and 33 are discarded.

It is noted that the procedure of calculating the areas of all shot images and selecting the original image according to the areas is not necessarily done. For example, if the image-shooting speed is relatively lower (e.g. 4 shot images per second), the adverse influence resulting from the rocking of the user's hand becomes more serious. In this situation, the area differences between the respective shot images and the business card are relatively larger, and thus the procedure of selecting the original image according to the calculated areas needs to be performed. On the other hand, if the image-shooting speed is relatively higher (e.g. 30 shot images per second), the procedure of selecting the original image according to the calculated areas may be omitted. In this situation, some images are directly selected from the plural shot images to be used as the original images.

The number of original images may be varied according to the practical requirements. For example, the number of original images is 2 or more than 2. In this embodiment, three original images $I_1$, $I_2$ and $I_3$ are selected from the plural shot images.

Figure 5:
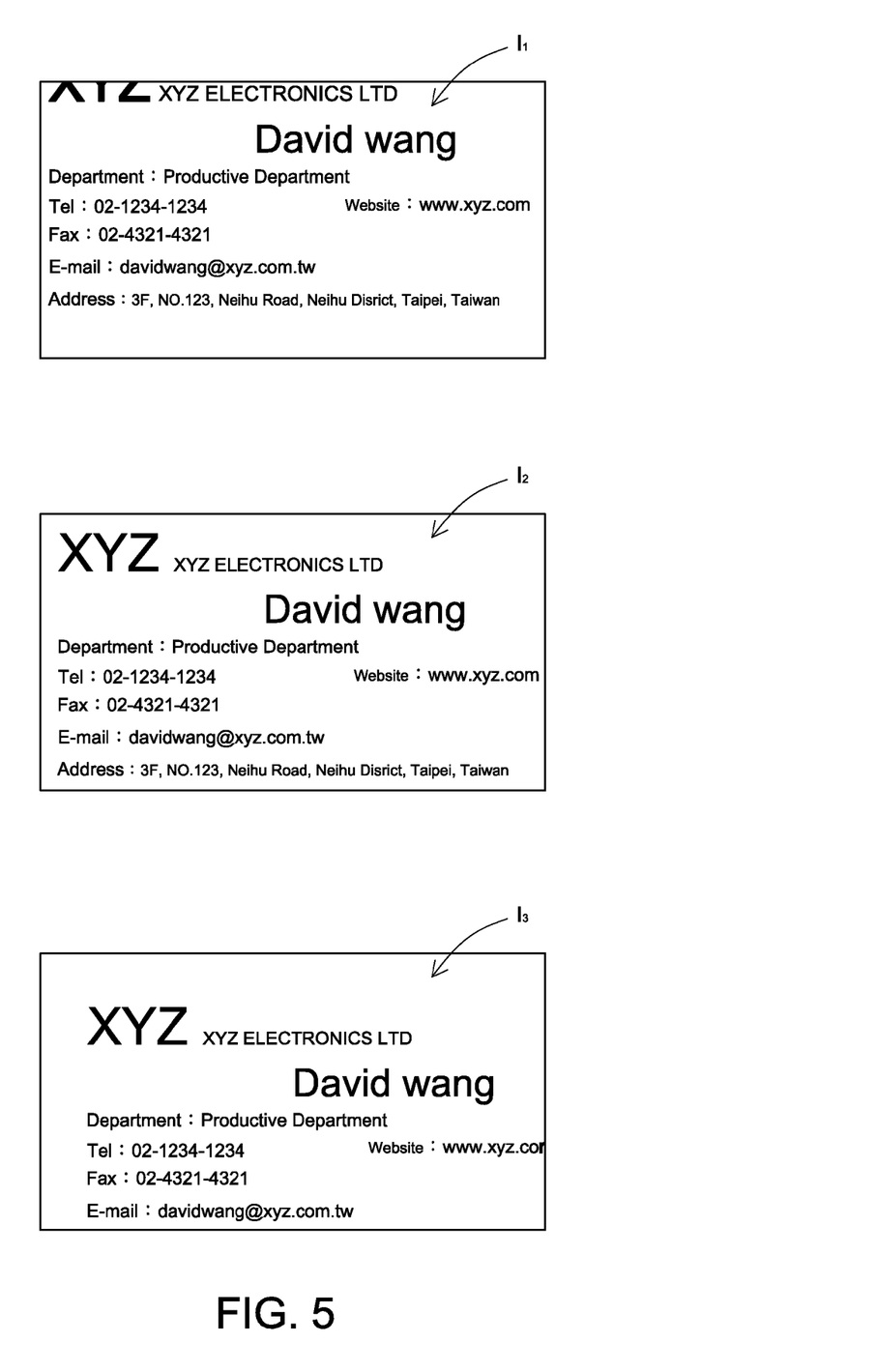
FIG. 5 schematically illustrates three original images acquired by the high resolution image producing method according to the first embodiment of the present invention.

In practice, as shown in FIG. 5, the graphic parts of the first original image $I_1$, the second original image $I_2$ and the third original image $I_3$ are somewhat different because of the tiny motion of the user's hand. As a consequence, the displacement of the first original image $I_1$ with respect to the second original image $I_2$ and the displacement of the second original image $I_2$ with respect to the third original image $I_3$ should be previously calculated.

Figure 6:
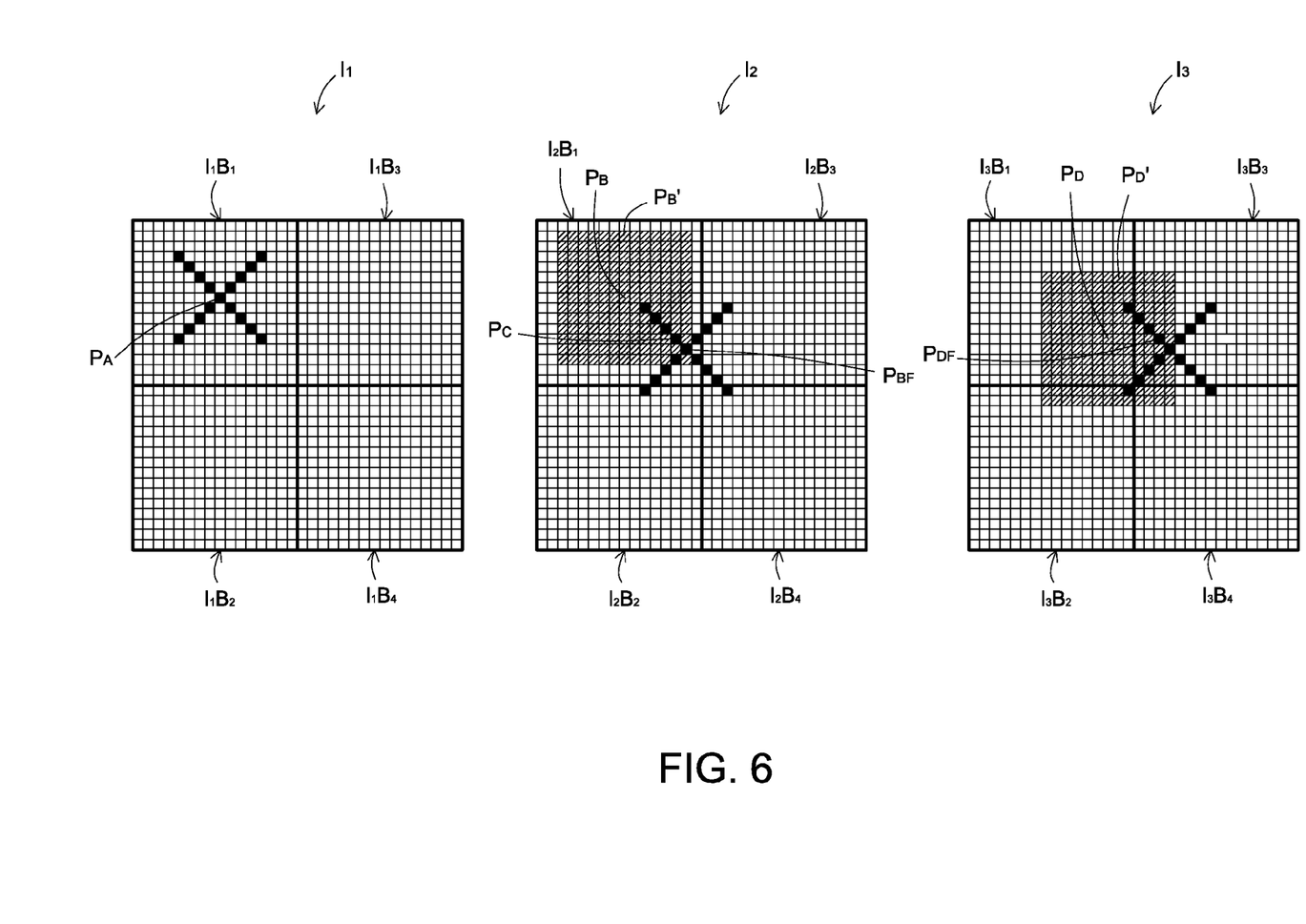
FIG. 6 schematically illustrates the step of calculating a block motion vector in the high resolution image producing method according to the first embodiment of the present invention.

In the step S3, the three original images $I_1$, $I_2$ and $I_3$ are segmented into plural blocks. FIG. 6 schematically illustrates the pixels of the three original images $I_1$, $I_2$ and $I_3$. For brevity, four 16×16-pixel blocks and a portion of the graphic part for each original image are shown. For example, as shown in FIG. 6, the first original image $I_1$ is segmented into four blocks $I_1B_1$, $I_1B_2$, $I_1B_3$ and $I_1B_4$, the second original image $I_2$ is segmented into four blocks $I_2B_1$, $I_2B_2$, $I_2B_3$ and $I_2B_4$, and the third original image $I_3$ is segmented into four blocks $I_3B_1$, $I_3B_2$, $I_3B_3$ and $I_3B_4$.

In the step S4, the motion vectors of respective blocks of each original image are calculated. Please refer to FIG. 6 again. Each original image comprises a graphic part (e.g. the characters or picture information of the business card) and a blank part. In FIG. 6, each grid indicates a pixel. The grids marked by a black color indicate the pixels constituting the graphic part.

Hereinafter, a way of calculating the displacement of the graphic part of the blocks $I_1B_1$, $I_1B_2$, $I_1B_3$ and $I_1B_4$ of the first original image $I_1$ with respect to the second original image $I_2$ will be illustrated with reference to FIG. 6. Take the block $I_1B_1$ for example. Any pixel of the block $I_1B_1$ may be selected as a first datum point. In this embodiment, the pixel $P_A$ is selected as the first datum point. Then, the pixel of the second original image $I_2$ at the same coordinate as the first datum point $P_A$ is selected as a second datum point. As shown in FIG. 6, the pixel $P_B$ is selected as the second datum point. Then, an n×n matrix whose center corresponds to the second datum point $P_B$ and the other elements correspond to neighboring pixels is defined as a searching range, wherein n is an integer. For example, if n=13 (see FIG. 6), the 13×13 matrix is the searching range. The searching range contains 168 neighboring pixels $P_B{'}$, which are marked by oblique lines. The brightness value of the first datum point $P_A$ is compared with each of the 168 neighboring pixels $P_B{'}$ within the searching range. The pixel whose brightness value is the closest to the brightness value of the first datum point $P_A$ is selected as a third datum point. For example, since the difference between the brightness value of the pixel $P_{BF}$ and the brightness value of the first datum point $P_A$ is the lowest, the pixel $P_{BF}$ is selected as the third datum point. The third datum point $P_{BF}$ is the final pixel position of moving the first datum point $P_A$ with respect to the second original image $I_2$. By subtracting the coordinate value of the first datum point $P_A$ from the coordinate value of the third datum point $P_{BF}$, a block motion vector $V_{I_1B_1\_I_2}$ of the block $I_1B_1$ of the first original image $I_1$ with respect to the second original image $I_2$ is obtained. The above procedures are repeatedly done for the other blocks $I_1B_2$, $I_1B_3$ and $I_1B_4$ of the first original image $I_1$. Consequently, the block motion vector of each block of the first original image $I_1$ is obtained.

Hereinafter, a way of calculating the displacement of the graphic part of the blocks $I_2B_1$, $I_2B_2$, $I_2B_3$ and $I_2B_4$ of the second original image $I_2$ with respect to the third original image $I_3$ will be illustrated with reference to FIG. 6. Take the block $I_2B_1$ for example. Any pixel of the block $I_2B_1$ may be selected as a first datum point. In this embodiment, the pixel $P_C$ is selected as the first datum point. Then, the pixel $P_D$ of the third original image $I_3$ at the same coordinate as the first datum point $P_C$ is selected as a second datum point. Then, a 13×13 matrix whose center corresponds to the second datum point $P_D$ and the other elements correspond to 168 neighboring pixels is defined as a searching range in order to calculate the brightness value differences. That is, the brightness value of the first datum point $P_C$ is compared with each of the 168 neighboring pixels $P_D'$ within the searching range. The pixel whose brightness value is the closest to the brightness value of the first datum point $P_C$ is selected as a third datum point. For example, the pixel $P_{DF}$ is selected as the third datum point. The third datum point $P_{DF}$ is the final pixel position of moving the first datum point $P_C$ with respect to the third original image $I_3$. By subtracting the coordinate value of the first datum point $P_C$ from the coordinate value of the third datum point $P_{DF}$, a block motion vector $V_{I2B1\_I3}$ of the block $I_2B_1$ of the second original image $I_2$ with respect to the third original image $I_3$ is obtained. The above procedures are repeatedly done for the other blocks $I_2B_2$, $I_2B_3$ and $I_2B_4$ of the second original image $I_2$. Consequently, the block motion vector of each block of the second original image $I_2$ is obtained.

For assuring the accuracy of the block motion vector, the block motion vectors of the neighboring blocks around the block B whose block motion vector is zero will be checked. If the block motion vectors of more than three neighboring blocks around the block B are not zero, the average of the block motion vectors of these neighboring blocks is determined as the block motion vector of the block B.

After the displacement relationships between the first original image $I_1$, the second original image $I_2$ and the third original image $I_3$ are obtained, the procedure of reconstructing the high resolution image will be started.

Figure 7:
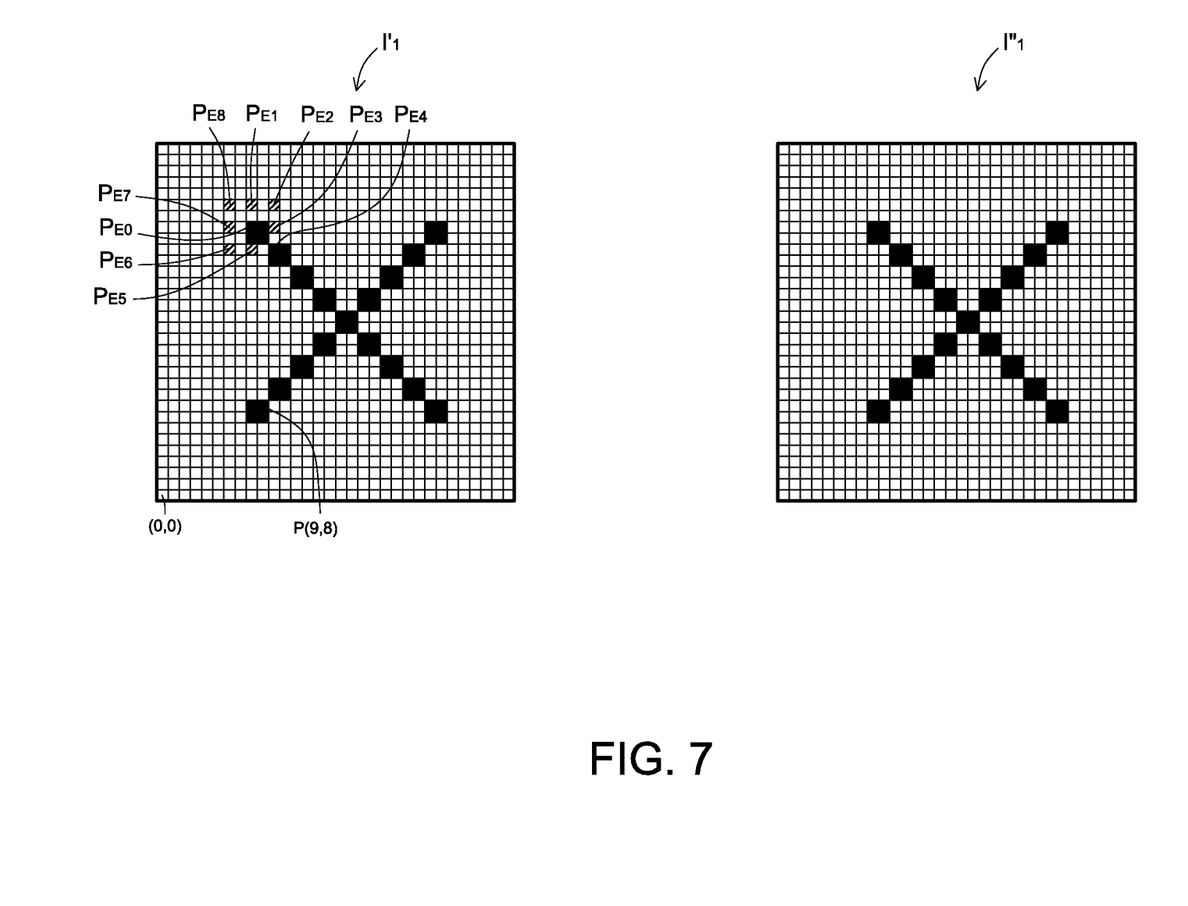
FIG. 7 schematically illustrates a first basis image and a second basis image acquired by the high resolution image producing method according to the first embodiment of the present invention.

In the step S5, a first basis image $I'_1$ and a second basis image $I''_1$ are produced. Then, in the step S6, a phase error is calculated according to the first basis image $I'_1$. That is, the pixel motion position is calculated according to the first basis image $I'_1$. Then, an interpolating operation is performed on the second basis image $I''_1$ to obtain a high resolution image H. In this embodiment, the first basis image $I'_1$ is obtained by magnifying the first original image $I_1$ with a first magnification factor (for example, the first magnification factor is 2). The second basis image $I''_1$ is obtained by copying the first basis image $I'_1$. As shown in FIG. 7, after the first original image $I_1$ is magnified, some extra pixels that are not originally existed in the first original image $I_1$ will be generated. For example, these extra pixels are created by performing a linear interpolating operation. For example, the brightness value of an extra pixel P is equal to the average of the brightness values of the neighboring pixels around the extra pixel P. For brevity, only a block of the first basis image $I'_1$ and a block of the second basis image $I''_1$ are shown in FIG. 7.

By the way, in a case that the first magnification factor is 2, the coordinate value (9, 8) of the extra pixel P of the first basis image $I'_1$ corresponds to the coordinate value (4.5, 4) of the pixel position of the first original image $I_1$. Since the pixel position (4.5, 4) is not included in the first original image $I_1$, the pixel of the first original image $I_1$ that is the closest to the pixel position (4.5, 4) is determined as the pixel position corresponding to the extra pixel P of the first basis image $I'_1$. That is, the pixel position (5, 4) or the pixel position (4, 4) of the first original image $I_1$ corresponds to the extra pixel P to be further post-processed.

Moreover, since there is a displacement relationship between the graphic parts of the original images, there is also a displacement relationship between the pixels of the original images. Consequently, after the motion pixel positions of all pixels of the first basis image $I'_1$ with respect to the second original image $I_2$ and the third original image $I_3$ are calculated, the interpolating operation is performed on the second basis image $I''_1$.

Figure 8:
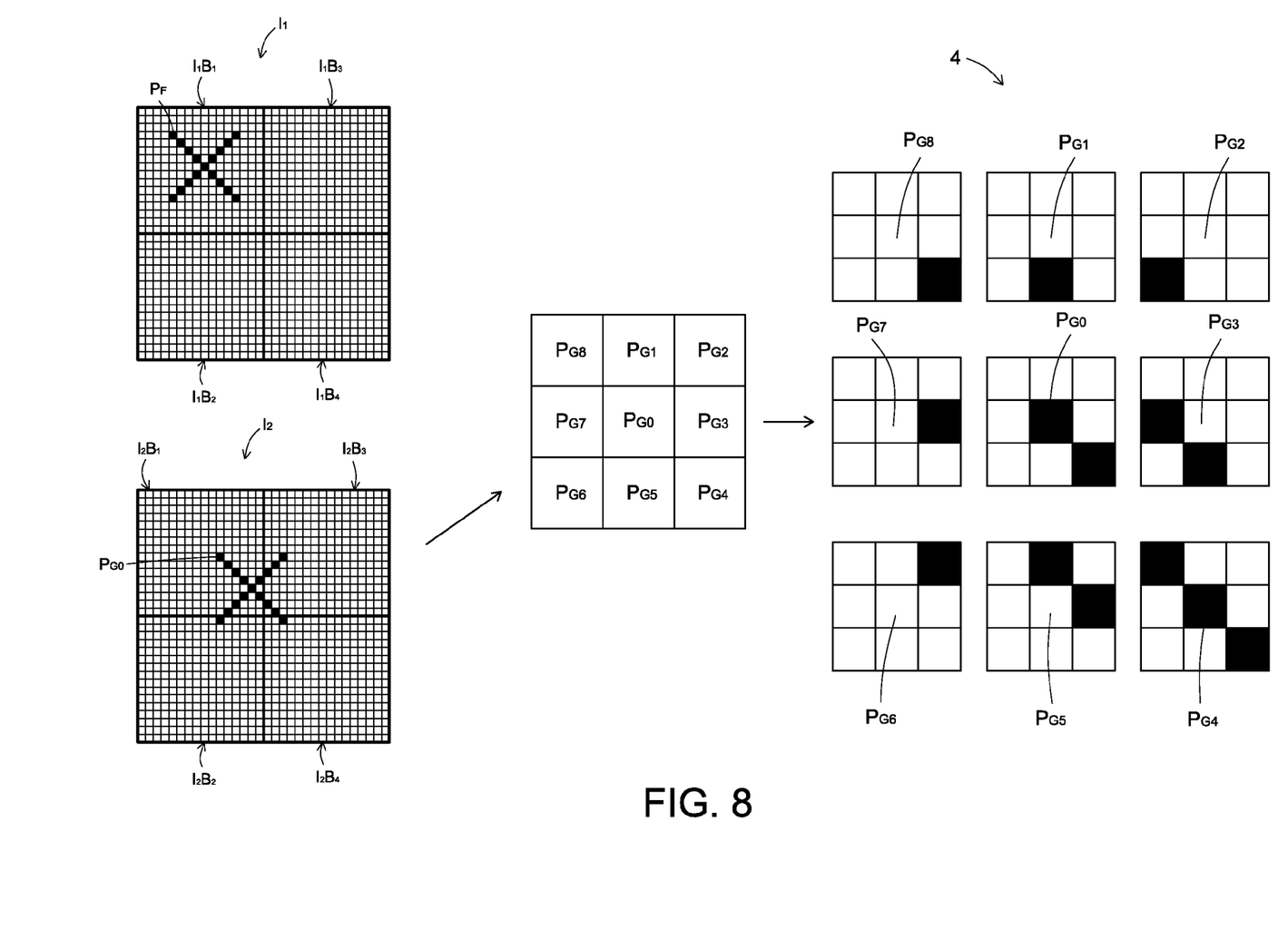
FIG. 8 schematically illustrates a way of calculating a first motion pixel position in the high resolution image producing method according to the first embodiment of the present invention.
Figure 9:
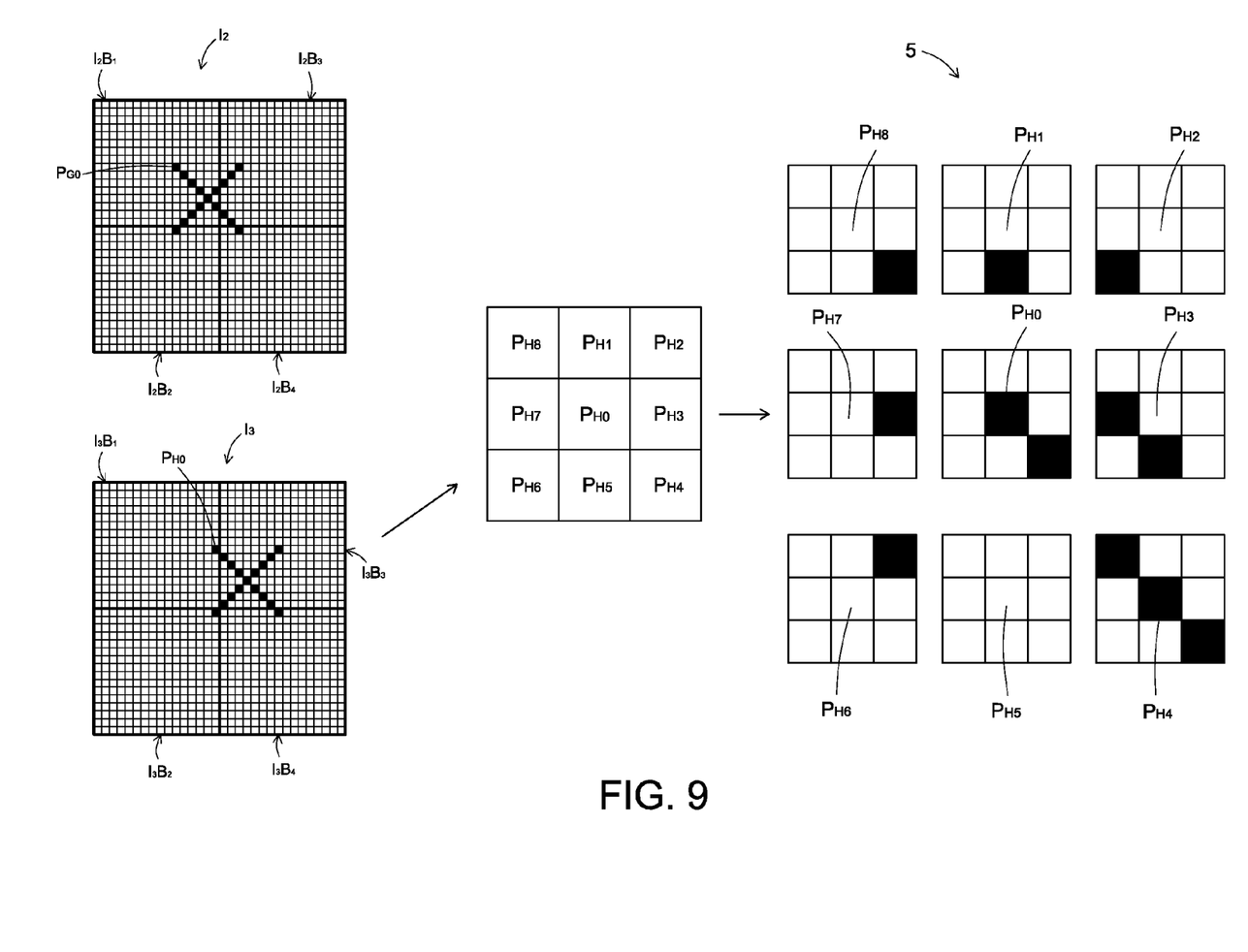
FIG. 9 schematically illustrates a way of calculating a second motion pixel position in the high resolution image producing method according to the first embodiment of the present invention.

Hereinafter, the motion pixel position of each pixel of the first basis image $I'_1$ will be illustrated with reference to FIGS. 8 and 9. In FIG. 8, the way of calculating the motion pixel position of each pixel of the first basis image $I'_1$ with respect to the second original image $I_2$ is illustrated. Whereas, in FIG. 9, the way of calculating the motion pixel position of each pixel of the first basis image $I'_1$ with respect to the third original image $I_3$ is illustrated. The original images $I_1$, $I_2$, $I_3$ and the segmented blocks of each original image shown in FIGS. 8 and 9 are similar to those shown in FIG. 6, and are not redundantly described herein.

Firstly, a pixel of the first basis image $I'_1$ is selected as a operated pixel. For example, the pixel $P_{E0}$ is selected as the operated pixel. Then, the coordinate value (2X, 2Y) of the operated pixel $P_{E0}$ is divided by 2 (i.e. the first magnification factor), so that a first pixel $P_F$ of the first original image $I_1$ having the coordinate value (X, Y) is obtained. Since the first pixel $P_F$ is located in the block $I_1B_1$ of the first original image $I_1$, after the first pixel $P_F$ is moved with respect to the second original image $I_2$, a second pixel $P_{G0}$ of the second original image $I_2$ having the coordinate value ($X_{PG0}$, $Y_{PG0}$) is obtained according to block motion vector $V_{I1B1\_I2}$ of the block $I_1B_1$ with respect to the second original image $I_2$. That is, ($X_{PG0}$, $Y_{PG0}$)=(X, Y)+$V_{I1B1\_I2}$.

For acquiring a more accurate motion pixel position, after the motion pixel position (for example, in this embodiment, the motion pixel position is the second pixel $P_{G0}$) is calculated according to the block motion vector, a brightness comparing step may be performed to confirm the final motion pixel position. Hereinafter, the brightness comparing step will be illustrated with reference to FIGS. 7 and 8. Take the comparison of the brightness value of the operated pixel $P_{E0}$ with the brightness values of the neighboring pixels $P_{E1}$~$P_{E8}$ for example (see FIG. 7). Then, a (2n−1)×(2n−1) matrix whose center corresponds to the operated pixel $P_{E0}$ and the other elements correspond to neighboring pixels is defined as a searching range, wherein n is the first magnification factor. Then, as shown in FIG. 8, plural pixel matrixes 4 are obtained. The pixel matrix 4 has a center corresponding to the second pixel $P_{G0}$ and other elements corresponding to the neighboring pixels $P_{G1}$~$P_{G8}$ whose coordinate values are ($X_{PG0}$±1, $Y_{PG0}$±1). Then, a first average brightness difference is calculated by the following formula: $(\Sigma|(Y\ P_{En} - Y\ P_{Gn})|)/9$, wherein Y is the brightness value and n=0~8. Then, the brightness values of the 3×3 matrixes whose centers respectively correspond to the neighboring pixels $P_{G1}$~$P_{G8}$ are compared with the brightness values of the operated pixel $P_{E0}$ and the neighboring pixels $P_{E1}$~$P_{E8}$, thereby calculating plural average brightness differences. The pixel matrix having the lowest average brightness difference is selected, and the center pixel of this pixel matrix is determined as a first motion pixel of the operated pixel $P_{E0}$ with respect to the second original image $I_2$. In this embodiment, the first motion pixel is the pixel $P_{G0}$. Afterwards, a first interpolation pixel value is obtained by averaging the brightness values of the operated pixel $P_{E0}$ and the first motion pixel $P_{G0}$. The first interpolation pixel value is filled into the same coordinate position of the second basis image $I''_1$ as the operated pixel $P_{E0}$.

By the way, after the first interpolation pixel value is acquired, if the interpolating operation is directly performed on the first basis image $I'_1$, the brightness value of the operated pixel of the first basis image $I'_1$ will be changed to the first interpolation pixel value. Meanwhile, if the brightness value of the operated pixel is used to calculate the motion pixel of the operated pixel with respect to the third original image $I_3$, the brightness comparing step may be erroneously performed. In this situation, the motion pixel position fails to be accurately acquired. In accordance with the present invention, the motion pixel position is calculated according to the first basis image $I'_1$, and the interpolation pixel values are filled into the pixels of the second basis image $1''_1$. As a consequence, during the motion pixel position is calculated, the brightness value of the operated pixel of the first basis image $I'_1$ is not changed, and the interpolating operation for filling the interpolation pixel value into the second basis image $I''_1$ is simultaneously done.

Please refer to FIGS. 8 and 9. Then, the motion pixel position of each pixel of the first basis image $I'_1$ with respect to the third original image $I_3$ is calculated. Since the first motion pixel $P_{G0}$ is located in the block $I_2B_1$ of the second original image $I_2$, after the first motion pixel $P_{G0}$ is moved with respect to the third original image $I_3$, a third pixel $P_{H0}$ of the third original image $I_3$ having the coordinate value ($X_{PH0}$, $Y_{PH0}$) is obtained according to block motion vector $V_{I2B1\_I3}$ of the block $I_2B_1$ with respect to the third original image $I_3$. If the coordinate value of the first motion pixel $P_{G0}$ is ($X_{PG0}$, $Y_{PG0}$), ($X_{PH0}$, $Y_{PH0}$)=($X_{PG0}$, $Y_{PG0}$)+$V_{I2B1\_I3}$.

Then, a brightness comparing step is performed to confirm the final motion pixel position of the first motion pixel $P_{G0}$. Then, plural pixel matrixes 5 (see FIG. 9) are obtained. The pixel matrix 5 has a center corresponding to the third pixel $P_{H0}$ and other elements corresponding to the neighboring pixels $P_{H1}$~$P_{H8}$ whose coordinate values are ($X_{PH0}\pm1$, $Y_{PH0}\pm1$). Then, a first average brightness difference is calculated by the following formula: $(\Sigma|(Y\ P_{En}-Y\ P_{Hn})|)/9$, wherein Y is the brightness value and n=0~8. Then, the brightness values of the 3×3 matrixes whose centers respectively correspond to the neighboring pixels $P_{H1}$~$P_{H8}$ are compared with the brightness values of the operated pixel $P_{E0}$ and the neighboring pixels $P_{E1}$~$P_{E8}$, thereby calculating plural average brightness differences. The pixel matrix having the lowest average brightness difference is selected, and the center pixel of this pixel matrix is determined as a second motion pixel of the operated pixel $P_{E0}$ with respect to the third original image $I_3$. In this embodiment, the second motion pixel is the pixel $P_{H0}$. Afterwards, a second interpolation pixel value is obtained by averaging the first interpolation pixel value and the brightness value of the second motion pixel $P_{H0}$. The second interpolation pixel value is filled into the same coordinate position of the second basis image $I''_1$ as the operated pixel $P_{E0}$.

The above steps are repeatedly performed on all pixels of the first basis image $I'_1$ and the second basis image $I''_1$ until the interpolating operations on all pixels of the second basis image $I''_1$ are performed.

After the interpolating operations on all pixels of the second basis image $I''_1$ are completely done, the brightness value of the pixel of the second basis image $I''_1$ is a combined brightness value of the first original image, the second original image and the third original image. Consequently, the pixel brightness value of the second basis image $I''_1$ is closer to the pixel brightness value of the real image. For example, the brightness value of each pixel may be expressed by a gray level ranged from 0 (full black) to 255 (full white). The way of expressing the pixel brightness value by a gray level is known in the art, and is not redundantly described herein. For example, if a real image of a pixel $P_X$ is black, the ideal brightness value of the pixel in the shot image is 0. Due to data loss or data error of the original image which is obtained by shooting the object, the brightness value of the pixel $P_X$ in the original image is not completely consistent or close to 0. Assuming the brightness value of the pixel $P_X$ in the first original image $I_1$ is 8, the brightness value of the pixel $P_X$ in the second original image $I_2$ is possibly 4 and the brightness value of the pixel $P_X$ in the third original image $I_1$ is possibly 2. After the interpolating operations on all pixels of the second basis image $I''_1$ are completely done, the final brightness value of the pixel $P_X$ in the second basis image $I''_1$ is 4. That is, the final brightness value (=4) is closer to the real image than the initial brightness value (=8).

As a consequence, after the interpolating operations on all pixels of the second basis image $I''_1$ are completely done, the sharpness of the second basis image $I''_1$ is largely enhanced when compared with the original image. Meanwhile, a high resolution image H with enhanced sharpness is obtained.

Then, the step S7 is performed to compress the high resolution image H into an output image. Generally, the high resolution image H may have a jagged edge. For facilitating recognition of the business card, the high resolution image H is compressed to a half of size in this step, thereby anti-aliasing the edge and reducing occurrence of the jagged edge. In this situation, the output image has enhanced sharpness. When a character recognition procedure is performed on the output image, the character recognition rate will be increased.

Figure 10:
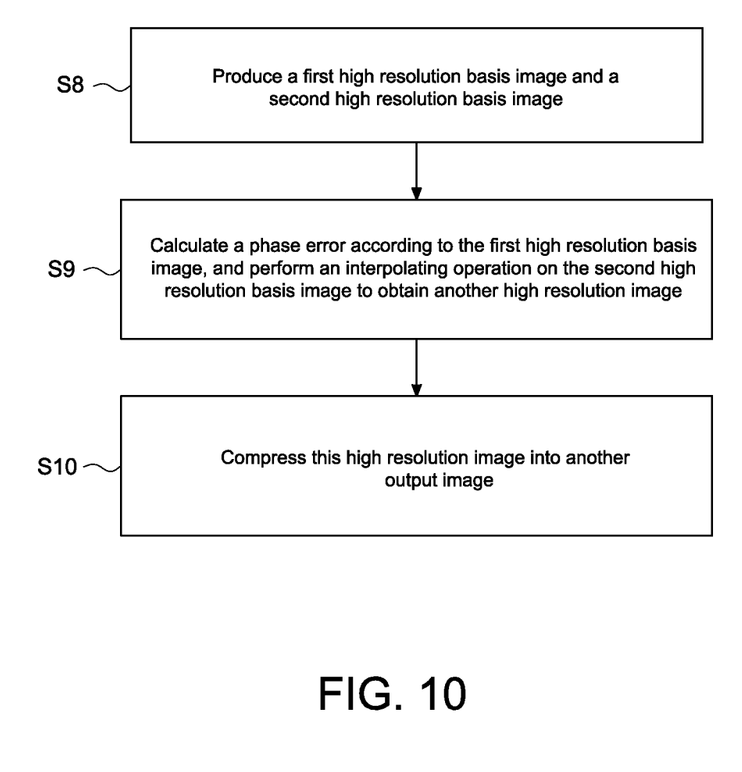
FIG. 10 is a flowchart illustrating a high resolution image producing method according to a second embodiment of the present invention.

FIG. 10 is a flowchart illustrating a high resolution image producing method according to a second embodiment of the present invention. After the step S6 as described in FIG. 2 is performed, the steps S8~S9 similar to the steps S5~S7 are performed on the high resolution image H, which is produced in the step S6.

In the step S8, a first high resolution basis image H' and a second high resolution basis image H'' are produced. In this embodiment, the high resolution image H is defined as the first high resolution basis image H', and the second high resolution basis image H'' is obtained by copying the first high resolution basis image H'.

In the step S9, a phase error is calculated according to the first high resolution basis image H'. That is, the pixel motion position is calculated according to the first high resolution basis image H'. Then, an interpolating operation is performed on the second high resolution basis image H'' to obtain another high resolution image. Then, the positions of the motion pixels of the second original image $I_2$ and the third original image $I_3$ corresponding to the operated pixel of the first high resolution basis image H' and the interpolation pixel values are acquired. Afterwards, an interpolating operation is performed to fill the interpolation pixel values into the second high resolution basis image H''. The ways of acquiring the motion pixel positions and the interpolation pixel values and performing the interpolating operation are similar to those illustrated above, and are not redundantly described herein.

After the interpolating operations on all pixels of the second high resolution basis image H'' are completely done, the brightness value of the pixels of the high resolution basis image H'' are closer to the brightness value of the real image. In other words, according to the method of the present invention, when the high resolution image obtained by the interpolating operation is defined as a basis image and the interpolating operation is performed again, a sharper high resolution image will be acquired.

Then, the step S10 is performed to compress this high resolution image into another output image. In this embodiment, this high resolution image is compressed to a half of size, so that this output image has the same size as the first original image $I_1$.

From the above description, in the initial stage of the high resolution image producing method of the present invention, each original image is segmented into plural blocks, and then the block motion vector of each block with respect to each original image is precisely calculated, so that the motion pixel position error between the plural original images is reduced to be less than a pixel. In the final stage, the interpolating operation is performed to quickly acquire the accurate motion pixel position. Since the time-consuming repeated correcting stage is omitted, the time period of producing high resolution image is shortened to be several seconds.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A high resolution image producing method, comprising steps of:
   (A) successively shooting an object for plural times to acquire plural shot images of said object;
   (B) selecting two original images from said plural shot images;
   (C) segmenting said two original images into plural blocks, respectively, wherein each block comprises plural pixels;
   (D) calculating a displacement of a graphic part of each block of a first original image with respect to a second original image, thereby acquiring a block motion vector of each block of said first original image;
   (E) scaling-up said first original image with a first amplification factor, thereby acquiring a first basis image;
   (F) copying said first basis image to acquire a second basis image;
   (G) calculating a position of a motion pixel of said second original image corresponding to an operated pixel of said first basis image, calculating an average of a brightness value of said operated pixel of said first basis image and a brightness value of said motion pixel to acquire an interpolation pixel value, and performing an interpolating operation to fill said interpolation pixel value into the same coordinate position of said second basis image as said operated pixel of said first basis image; and
   (H) repeatedly performing said step (G) until said interpolating operation is performed on all pixels of said second basis image, thereby producing a high resolution image H.

2. The high resolution image producing method according to claim 1 wherein after said step (H), said method further comprises a step (I) of compressing said high resolution image H into an output image.

3. The high resolution image producing method according to claim 1 wherein said step (B) of selecting said two original images comprises sub-steps of:

detecting four edges of each of said shot images to acquire four corners of each of said shot images;
calculating an area of each of said shot images according to said four corners of each of said shot images; and
acquiring said two original images according to a difference between said area of each of said shot images and an area of said object.

4. The high resolution image producing method according to claim 1 wherein after said step (H), said method further comprises steps of:
   (I) defining said high resolution image H as a first high resolution basis image H';
   (J) copying said first high resolution basis image H' to acquire a second high resolution basis image H";
   (K) calculating a position of a motion pixel of said second original image corresponding to an operated pixel of said first high resolution basis image H', calculating an average of a brightness value of said operated pixel of said first high resolution basis image H' and a brightness value of said motion pixel to acquire an interpolation pixel value, and performing an interpolating operation to fill said interpolation pixel value into the same coordinate position of said second high resolution basis image H" as said operated pixel of said first high resolution basis image H';
   (L) repeatedly performing said step (K) until said interpolating operation is performed on all pixels of said second high resolution basis image H", thereby producing another high resolution image; and
   (M) compressing said another high resolution image into another output image.

5. The high resolution image producing method according to claim 1 wherein said step (D) of acquiring said block motion vector of each block of said first original image comprises sub-steps of:
   selecting a pixel of a block of said first original image to be a first datum point, and selecting another pixel of said second original image at the same coordinate position as said first datum point to be a second datum point;
   calculating brightness values of said second datum point and plural neighboring pixels around said second datum point;
   comparing a brightness value of said first datum point with respective brightness values of said second datum point and said plural neighboring pixels around said second datum point;
   selecting a pixel whose brightness value is the closest to said brightness value of said first datum point to be a third datum point; and
   subtracting said coordinate value of said first datum point from a coordinate value of said third datum point, thereby obtaining said block motion vector.

6. The high resolution image producing method according to claim 1 wherein said step (G) of calculating said position of said motion pixel comprises sub-steps of:
   (G-1) acquiring said operated pixel (nX, nY) of a block of said first basis image and plural neighboring pixels (nX±n, nY±n) around said operated pixel, calculating brightness values of said operated pixel and said plural neighboring pixels around said operated pixel, and dividing a coordinate value of said operated pixel by said first amplification factor of said first original image to acquire a pixel (X,Y) of said first original image corresponding to said operated pixel, wherein n is said first amplification factor;

(G-2) calculating a position of moving said pixel (X,Y) to a pixel (X', Y') of said second original image according to said block motion vector of said block where said pixel (X,Y) is located;

(G-3) defining a (2n−1)×(2n−1) matrix whose center corresponds to said pixel (X', Y') as a searching range, and calculating brightness values of plural pixels of a 3×3 matrix whose center corresponds to said pixel (X', Y'), wherein n is said first amplification factor;

(G-4) calculating an average brightness difference between said plural pixels of said 3×3 matrix whose center corresponds to said pixel (X', Y') and said operated pixel (nX, nY) and said plural neighboring pixels (nX±n, nY±n) around said operated pixel;

(G-5) selecting a pixel (X", Y") from said plurality pixels of said (2n−1)×(2n−1) matrix whose center corresponds to said pixel (X', Y'), and calculating an average brightness difference between said plural pixels of said 3×3 matrix whose center corresponds to said pixel (X", Y") and said operated pixel (nX, nY) and said plural neighboring pixels (nX±n, nY±n) around said operated pixel;

(G-6) repeatedly performing said step (G-5) until all average brightness differences are acquired, wherein n is said first amplification factor;

(G-7) selecting a pixel matrix having the lowest average brightness difference, and defining a center pixel of said pixel matrix as said motion pixel of said second original image corresponding to said operated pixel; and (G-8) repeatedly performing said steps (G-1) through (G-7) until all motion pixels of said second original image corresponding to all pixels of all blocks of said first basis image are acquired.

7. A high resolution image producing method, comprising steps of:

(A) successively shooting an object for plural times to acquire plural shot images of said object;

(B) selecting three original images from said plural shot images;

(C) segmenting said three original images into plural blocks, respectively, wherein each block comprises plural pixels;

(D) calculating a displacement of a graphic part of each block of a first original image with respect to a second original image, thereby acquiring a block motion vector of each block of said first original image;

(E) calculating a displacement of a graphic part of each block of said second original image with respect to a third original image, thereby acquiring a block motion vector of each block of said second original image;

(F) scaling-up said first original image with a first amplification factor, thereby acquiring a first basis image;

(G) copying said first basis image to acquire a second basis image;

(H) calculating a position of a first motion pixel of said second original image corresponding to an operated pixel of said first basis image, calculating an average of a brightness value of said operated pixel of said first basis image and a brightness value of said first motion pixel to acquire a first interpolation pixel value, and performing an interpolating operation to fill said first interpolation pixel value into the same coordinate position of said second basis image as said operated pixel;

calculating a position of a second motion pixel of said third original image corresponding to said operated pixel of said first basis image, calculating an average of said first interpolation pixel value and a brightness value of said second motion pixel to acquire a second interpolation pixel value, and performing an interpolating operation to fill said second interpolation pixel value into the same coordinate position of said second basis image as said operated pixel; and (I) repeatedly performing said step (H) until said interpolating operation is performed on all pixels of said second basis image, thereby producing a high resolution image H.

8. The high resolution image producing method according to claim 7 wherein after said step (I), said method further comprises a step (J) of compressing said high resolution image H into an output image.

9. The high resolution image producing method according to claim 7 wherein said step (B) of selecting said three original images comprises sub-steps of:

detecting four edges of each of said shot images to acquire four corners of each of said shot images;

calculating an area of each of said shot images according to said four corners of each of said shot images; and acquiring said three original images according to a difference between said area of each of said shot images and an area of said object.

10. The high resolution image producing method according to claim 7 wherein after said step (I), said method further comprises steps of:

(J) defining said high resolution image H as a first high resolution basis image H';

(K) copying said first high resolution basis image H' to acquire a second high resolution basis image H";

(L) calculating a position of a first motion pixel of said second original image corresponding to an operated pixel of said first high resolution basis image H', calculating an average of a brightness value of said operated pixel of said first high resolution basis image H' and a brightness value of said first motion pixel to acquire a first interpolation pixel value, and performing an interpolating operation to fill said first interpolation pixel value into the same coordinate position of said second high resolution basis image H" as said operated pixel of said first high resolution basis image H';

calculating a position of a second motion pixel of said third original image corresponding to said operated pixel of said first high resolution basis image H', calculating an average of said first interpolation pixel value and a brightness value of said second motion pixel to acquire a second interpolation pixel value, and performing an interpolating operation to fill said second interpolation pixel value into the same coordinate position of said second high resolution basis image H" as said operated pixel of said first high resolution basis image H';

(M) repeatedly performing said step (L) until said interpolating operation is performed on all pixels of said second high resolution basis image H", thereby producing another high resolution image; and (N) compressing said another high resolution image into another output image.

11. The high resolution image producing method according to claim 1 wherein said step (D) of acquiring said block motion vector of each block of said first original image comprises sub-steps of:

selecting a pixel of a block of said first original image to be a first datum point, and selecting another pixel of said second original image at the same coordinate position as said first datum point to be a second datum point;

calculating brightness values of said second datum point and plural neighboring pixels around said second datum point;

comparing a brightness value of said first datum point with respective brightness values of said second datum point and said plural neighboring pixels around said second datum point;

selecting a pixel whose brightness value is the closest to said brightness value of said first datum point to be a third datum point; and subtracting said coordinate value of said first datum point from a coordinate value of said third datum point, thereby obtaining said block motion vector.

12. The high resolution image producing method according to claim 1 wherein said step (E) of acquiring said block motion vector of each block of said second original image comprises sub-steps of:

selecting a pixel of a block of said second original image to be a first datum point, and selecting another pixel of said third original image at the same coordinate position as said first datum point to be a second datum point;

calculating brightness values of said second datum point and plural neighboring pixels around said second datum point;

comparing a brightness value of said first datum point with respective brightness values of said second datum point and said plural neighboring pixels around said second datum point;

selecting a pixel whose brightness value is the closest to said brightness value of said first datum point to be a third datum point; and subtracting said coordinate value of said first datum point from a coordinate value of said third datum point, thereby obtaining said block motion vector.

13. The high resolution image producing method according to claim 7 wherein said step (H) of calculating said position of said motion pixel comprises sub-steps of:

(H-1) acquiring said operated pixel (nX, nY) of a block of said first basis image and plural neighboring pixels (nX±n, nY±n) around said operated pixel, calculating brightness values of said operated pixel and said plural neighboring pixels around said operated pixel, and dividing a coordinate value of said operated pixel by said first amplification factor of said first original image to acquire a pixel (X,Y) of said first original image corresponding to said operated pixel, wherein n is said first amplification factor;

(H-2) calculating a position of moving said pixel (X,Y) to a pixel (X', Y') of said second original image according to said block motion vector of said block where said pixel (X,Y) is located;

(H-3) defining a (2n−1)×(2n−1) matrix whose center corresponds to said pixel (X', Y') as a searching range, and calculating brightness values of plural pixels of a 3×3 matrix whose center corresponds to said pixel (X', Y'), wherein n is said first amplification factor;

(H-4) calculating an average brightness difference between said plural pixels of said 3×3 matrix whose center corresponds to said pixel (X', Y') and said operated pixel (nX, nY) and said plural neighboring pixels (nX±n, nY±n) around said operated pixel;

(H-5) selecting a pixel (X", Y") from said plurality pixels of said (2n−1)×(2n−1) matrix whose center corresponds to said pixel (X', Y'), and calculating an average brightness difference between said plural pixels of said 3×3 matrix whose center corresponds to said pixel (X", Y") and said operated pixel (nX, nY) and said plural neighboring pixels (nX±n, nY±n) around said operated pixel;

(H-6) repeatedly performing said step (H-5) until all average brightness differences are acquired, wherein n is said first amplification factor;

(H-7) selecting a pixel matrix having the lowest average brightness difference, and defining a center pixel of said pixel matrix as said first motion pixel of said second original image corresponding to said operated pixel;

(H-8) calculating a position of moving said first motion pixel to a pixel (X", Y") of said third original image according to said block motion vector of said block where said first motion pixel of said second original image is located;

(H-9) defining a (2n−1)×(2n−1) matrix whose center corresponds to said pixel (X", Y") as a searching range, and calculating brightness values of plural pixels of a 3×3 matrix whose center corresponds to said pixel (X", Y"), wherein n is said first amplification factor;

(H-10) calculating an average brightness difference between said plural pixels of said 3×3 matrix whose center corresponds to said pixel (X", Y") and said operated pixel (nX, nY) and said plural neighboring pixels (nX±n, nY±n) around said operated pixel;

(H-11) selecting a pixel (X''', Y''') from said plurality pixels of said (2n−1)×(2n−1) matrix whose center corresponds to said pixel (X", Y"), and calculating an average brightness difference between said plural pixels of said 3×3 matrix whose center corresponds to said pixel (X''', Y''') and said operated pixel (nX, nY) and said plural neighboring pixels (nX±n, nY±n) around said operated pixel;

(H-12) repeatedly performing said step (H-11) until all average brightness differences are acquired, wherein n is said first amplification factor;

(H-13) selecting a pixel matrix having the lowest average brightness difference, and defining a center pixel of said pixel matrix as said second motion pixel of said third original image corresponding to said operated pixel; and (H-14) repeatedly performing said steps (H-1) through (H-13) until all motion pixels of said second original image and said third original image corresponding to all pixels of all blocks of said first basis image are acquired.

* * * * *